(12) United States Patent
Duvernier et al.

(10) Patent No.: US 9,126,377 B2
(45) Date of Patent: Sep. 8, 2015

(54) MOLDING ELEMENT COMPRISING CUTTING MEANS FOR MOLDING AND VULCANIZING A TIRE TREAD

(71) Applicants: COMPAGNIE GENERALE DES ETABLISSEMENTS MICHELIN, Clermont-Ferrand (FR); MICHELIN RECHERCHE ET TECHNIQUE S.A., Granges-Paccot (CH)

(72) Inventors: Marc Duvernier, Clermont-Ferrand (FR); Vincent Abad, Clermont-Ferrand (FR); Frédéric Perrin, Clermont-Ferrand (FR)

(73) Assignees: Compagnie Generale des Etablissements Michelin, Clermont-Ferrand (FR); Michelin Recherche et Technique S.A., Granges-Paccot (CH)

( * ) Notice: Subject to any disclaimer, the term of this patent is extended or adjusted under 35 U.S.C. 154(b) by 0 days.

(21) Appl. No.: 14/365,048

(22) PCT Filed: Dec. 14, 2012

(86) PCT No.: PCT/EP2012/075512
§ 371 (c)(1),
(2) Date: Jun. 12, 2014

(87) PCT Pub. No.: WO2013/087826
PCT Pub. Date: Jun. 20, 2013

(65) Prior Publication Data
US 2015/0104533 A1    Apr. 16, 2015

(30) Foreign Application Priority Data

Dec. 16, 2011 (FR) ...................... 11 61762

(51) Int. Cl.
*B29D 30/06* (2006.01)
(52) U.S. Cl.
CPC ........ *B29D 30/0601* (2013.01); *B29D 30/0606* (2013.01); *B29D 2030/0612* (2013.01); *B29D 2030/0613* (2013.01); *B29D 2030/0616* (2013.01)

(58) Field of Classification Search
CPC .......... B29D 30/0601; B29D 30/0606; B29D 2030/0613
See application file for complete search history.

(56) References Cited

U.S. PATENT DOCUMENTS

| 3,415,923 A | 12/1968 | Petersen |
| 3,432,888 A | 3/1969 | Brierley |

(Continued)

FOREIGN PATENT DOCUMENTS

| EP | 0510550 A1 | 10/1992 |
| GB | 1124915 | 8/1968 |

(Continued)

OTHER PUBLICATIONS

PCT/EP2012/075512, International Search Report (ISR), Form PCT/ISA/210, dated Mar. 13, 2013 (including English translation), 7 pgs.

*Primary Examiner* — James Mackey
(74) *Attorney, Agent, or Firm* — Dickinson Wright PLLC (57) ABSTRACT

A molding element of a mold for molding and vulcanizing a tire tread, this tread comprising a tread surface intended to come into contact with the ground when the tire is running. The molding element comprises a molding surface intended to mold part of the tire tread surface and a blade of length L and of height H intended to mold a sipe or a groove in the tread. This blade comprises a rounded end extending along the length of the blade in a direction of extension X. The molding element further comprises two cutting means positioned on either side of the blade at a certain distance from this blade. Each cutting means comprises a cutting edge extending in the direction of extension, this cutting edge making an acute angle in a cutting plane perpendicular to this direction of extension, the height of this cutting edge being greater than or equal to the height of the blade.

12 Claims, 4 Drawing Sheets

(56) References Cited

U.S. PATENT DOCUMENTS

| | | | |
|---|---|---|---|
| 4,553,918 A | 11/1985 | Yoda et al. | |
| 6,044,882 A | 4/2000 | Crawford et al. | |
| 6,202,725 B1 * | 3/2001 | Moriya | 152/209.23 |
| 6,408,911 B1 * | 6/2002 | Tanabe et al. | 152/209.5 |
| 2005/0109436 A1 | 5/2005 | Bruant et al. | |
| 2007/0039672 A1 | 2/2007 | Lo | |

FOREIGN PATENT DOCUMENTS

| | | |
|---|---|---|
| WO | 03089257 A1 | 10/2003 |
| WO | 2006069912 A1 | 7/2006 |

* cited by examiner

MOLDING ELEMENT COMPRISING CUTTING MEANS FOR MOLDING AND VULCANIZING A TIRE TREAD

This application is a 371 national phase entry of PCT/EP2012/075512, filed 14 Dec. 2012, which claims benefit of FR 1161762, filed 16 Dec. 2011, the contents of which are incorporated by reference herein for all purposes.

BACKGROUND

1. Field

The present disclosure relates to the field of molds for molding and vulcanizing a tire tread. More specifically, the disclosure relates to the molds used for molding in the tread grooves which are partially or completely covered by an additional cover layer.

2. Description of Related Art

It is known practice to design tires the tread of which comprises various rubber compounds. Document WO 03089257 discloses such treads. More specifically, document WO 03089257 discloses a tread comprising grooves the walls of which are covered with a cover layer. The material of which this cover layer is made differs from the rubber compound of which the tread is made. This material notably has much better wet grip than the wet grip of the rubber compound. This allows a very significant improvement in cornering performance on wet ground.

One way of manufacturing this tread is notably disclosed in document WO 2006069912. According to this method of manufacture, in a first step, provision is made for the material intended to constitute a cover layer to be injected in the form of one or more inserts into the green tire using an injection nozzle. The insert or inserts is or are then shaped, in a second step, by ribs of a vulcanizing mold so that they cover all or part of the walls of the grooves molded by these ribs.

This method of manufacture has its limits, particularly as far as obtaining precision moldings is concerned. Specifically, during the shaping thereof, the insert experiences a significant shear force from the rib in order to convert this insert into a layer of lesser thickness. This shear force may cause cracking within the insert, making it more difficult to control the movements of the material of which this insert is made. The shape and the thickness of the cover layer thus formed may therefore be somewhat haphazard. The advantages afforded by the additional layer to the performance of the tire are then reduced.

In addition, in this method of manufacture, it is necessary to make the inserts align with the ribs. This makes manufacture of the tread more complicated.

There is therefore a need to improve the incorporation of a cover layer on the walls of grooves of a tire tread.

DEFINITIONS

A "tire" means all types of elastic tire whether or not subjected to an internal pressure.

A "green tire" or "green form" of a tire means a superposition of a plurality of semi-finished rubber products present in the form of strips or sheets, with or without reinforcement. The green tire is intended to be vulcanized in a mold in order to obtain the tire.

The "tread" of a tire means a quantity of rubber material bounded by lateral surfaces and by two main surfaces one of which is intended to come into contact with a road surface when the tire is running.

A "tread surface" means the surface formed by those points on the tire tread that come into contact with the road surface when the tire is running.

A "mold" means a collection of separate molding elements which, when brought closer towards one another, delimit a toroidal molding space.

A "molding element" of a mold means part of a mold. A molding element is, for example, a mold segment.

A "molding surface" of a molding element means the surface of the mold that is intended to mold the surface of the tire tread.

A "blade" of a molding element means a protrusion projecting from the molding surface. In the blades category, a distinction is made between sipe blades which are less than 2 mm wide and ribs which have a width of 2 mm or more. Sipe blades are intended to mold sipes in the tire tread, which means cuts which at least partially close up when they fall within the contact patch where the tire makes contact with the ground. The ribs are intended to mold grooves in the tread, which means cuts which do not close up when they fall within the contact patch in which the tire makes contact with the ground.

A "blade with a rounded end" means that the end of the blade is domed.

The "height of the blade or, respectively, of the cutting edge" means the distance between the molding surface of the mold and the end of the blade or respectively of the cutting edge.

An "acute angle" means an angle smaller than 90°.

SUMMARY

The invention relates, in an embodiment, to a molding element of a mold for molding and vulcanizing a tire tread, this tread comprising a tread surface intended to come into contact with the ground when the tire is running. The molding element comprises a molding surface intended to mold part of the tire tread surface and a blade of length L and of height H intended to mold a sipe or a groove in the tread. This blade comprises a rounded end extending along the length of the blade in a direction of extension. The molding element further comprises two cutting means positioned on either side of the blade at a certain distance from this blade. Each cutting means comprises a cutting edge extending in the direction of extension, this cutting edge making an acute angle in a cutting plane perpendicular to this direction of extension, the height of this cutting edge being greater than or equal to the height of the blade.

The cutting means are able to cut a cover layer that covers a green tire. The blade itself will mold a cut in the tread and at the same time guide part of the cover layer into the cut thus molded.

The invention thus proposes, in an embodiment, that the cover layer be cut and some of this layer be positioned within the depth of the green tire during one and the same movement of the molding element with respect to the green tire.

In an alternative form of the embodiment, the angle of the cutting edge is less than or equal to 60°.

The cutting ability of the cutting means is thus improved.

In a preferred form of embodiment, the angle of the cutting edge is less than or equal to 35°.

The cutting ability of the cutting means is thus improved even further.

In another preferred form of embodiment, the angle of the cutting edge is less than or equal to 20°.

The cutting ability of the cutting means is thus improved even more.

In an alternative form of embodiment, the blade has a profile of length Lp exhibiting symmetry about an axis of symmetry perpendicular to the molding surface, this axis of symmetry intersecting the profile of the blade at the end of this blade to define two sub-profiles. For each cutting means, the distance between the cutting edge of this cutting means and the axis of symmetry of the profile is less than or equal to the length of the sub-profile adjacent to this cutting means.

By controlling the location of the cutting means with respect to the blade it is possible to be sure to limit the presence of material of the cover layer on the surface of the tread, the vast majority of this material finding its way into the cut. This therefore improves the overall appearance of the tire since the material of which the cover layer is made may differ in colour and texture from the rubber compound of which the tread is made.

In an alternative form of embodiment, the distance between the cutting edge and the axis of symmetry is less than or equal to 98% of the length of this sub-profile.

As the cover layer is being cut, there is the possibility that this layer will lengthen. By choosing a distance between the cutting edge and the axis of symmetry which is somewhat less than 100%, it is possible to ensure that the cut part of the cover layer will indeed all find its way into the cut rather than remaining on the surface of the tread.

In an alternative form of the embodiment, the distance between the cutting edge and the axis of symmetry is greater than or equal to half the length of this sub-profile.

Thus it is possible to ensure that a minimal quantity of material of which the cover layer is made will indeed be present in the cut.

In an alternative form of the embodiment, the end of the blade has a bulge.

This then improves the placement of the material of which the cover layer is made on the walls of the grooves.

In an alternative form of embodiment, the cutting means comprise two branches, each branch comprising a cutting edge forming an acute angle.

During demolding, each cutting means leaves a cut on the surface of the tread. This cut adds to the cut formed by the blade. The cutting means thus increase the groove-to-rubber ratio at the surface of the tread. By providing a cutting means that comprises two cutting edges, material of the cover layer can be placed in two cuts molded by two blades flanking this cutting means, and this can be achieved without increasing the groove-to-rubber ratio at the surface of the tread.

In an alternative form of embodiment, the end of the blade comprises a plurality of pads distributed along the length of this blade.

These pads make it possible to ensure that the cut part of the cover layer will indeed adhere to the end of the blade as this blade is driven into the green tire. This then limits any relative movement of the blade with respect to the cut part of the cover layer.

Another subject of the invention, in an embodiment, is a mold for molding and vulcanizing a tire tread, this mold comprising a plurality of molding elements as described hereinabove.

BRIEF DESCRIPTION OF THE DRAWINGS

Other features and advantages of the invention will emerge from the following description, given by way of nonlimiting example, with reference to the attached drawings in which.

DETAILED DESCRIPTION OF SPECIFIC EMBODIMENTS

In the description that follows, elements that are substantially identical or similar will be denoted by identical references.

Figure 1:
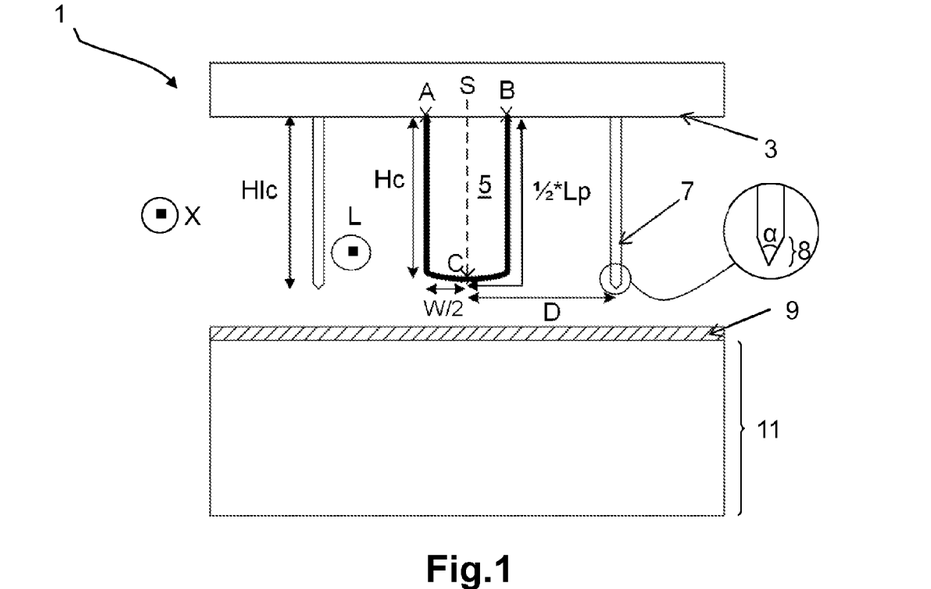
FIG. 1 schematically depicts a molding element according to an embodiment of the invention.

FIG. 1 depicts a molding element 1 according to the invention.

More specifically, the molding element 1 comprises a molding surface 3 intended to mold part of the tread surface of a tire. The molding element 1 also comprises blades 5 just one of which has been depicted here to make the invention easier to understand. The blade in this instance is a rib 5 intended to mold a groove in the tire tread. What is meant in a tire tread by a "groove" is a cut in this tread of which the width, i.e. the distance separating two lateral walls of this groove, is greater than 2 mm. The rib 5 extends heightwise from this molding surface 3. The rib 5 also extends lengthwise in a direction of extension X projecting from the molding surface 3. In the mold, this direction may be a circumferential direction that follows the circumference of the mold. As an alternative, the direction of extension is a transverse direction perpendicular to the circumferential direction of the mold. In another alternative form, this direction of extension is an oblique direction that makes a non-zero angle with the circumferential direction and with the transverse direction of the mold.

FIG. 1 depicts the molding element 1 viewed in a plane of section perpendicular to the direction of extension X. In this plane of section, the rib 5 has a cross section exhibiting symmetry with respect to an axis of symmetry S. The axis of symmetry S in this instance extends in the height Hc of the rib 5 and divides this rib 5 into two half-ribs of width W/2.

The rib here is of rectangular cross section. A "rectangular" shape means that the upper face of the rib is perpendicular to the lateral faces of this rib, i.e. that the lateral faces of the rib make with the upper face of this rib an angle of between 85° and 95°.

The invention also encompasses instances in which the regions of connection between the lateral faces of the rib and the upper face of this rib are rounded and instances in which the regions of connection between the lateral faces of the rib and the base are likewise rounded.

In additional alternative forms of embodiment, the cross section of the rib may adopt a shape other than a rectangular shape, such as a square shape, a triangular shape, etc.

It will also be noted that the cross section of the rib 5 has, between two points of intersection A and B of the rib 5 with the molding surface 3, a profile indicated in bold line in FIG. 1. This profile has a profile length Lp such that Lp=2*(Hc+W/2), i.e. such that the profile length Lp corresponds to twice the height Hc of the rib 5 to which the width W of this rib is added.

In the example of FIG. 1, the points of intersection A and B are readily determinable, the lateral walls of the rib 5 being perpendicular to the molding surface 3. As an alternative, if the lateral walls of the rib meet the molding surface 3 at two rounded connecting regions that form two arcs of a circle, the points of intersection A and B respectively correspond to the intersection of the arcs of a circle with straight lines passing through the centres of the circular arcs and dividing these arcs into two identical ½-arcs.

The molding element 1 of FIG. 1 also has two cutting means 7 positioned on either side of the rib 5. These cutting means extend in their lengthwise direction in a direction that is parallel to the longitudinal direction X of the rib 5. A "direction that is parallel" means that the direction of extension of the cutting means makes an angle of between −5° and +5° with the longitudinal direction of extension X of the rib. The height Hlc of the cutting means is at least equal to the height Hc of the rib.

Each cutting means comprises an end 8 able to cut a cover layer 9 covering a green form 11 of a tire. More specifically, each cutting means at its end comprises a cutting edge (indicated by a point in FIG. 1). This cutting edge has, in the plane of FIG. 1, an angle α less than or equal to 60° (refer to the inset of FIG. 1 which depicts an enlarged view of the end of one of the two cutting means 7). In a preferred embodiment, the angle α is less than or equal to 35°. In another preferred embodiment, the angle α is less than or equal to 20°.

It will be noted that this cutting edge may have been hardened beforehand in order to improve its long-term mechanical integrity. For example, the cutting edge may have been hardened in a special heat treatment. As an alternative, it is possible to plan for the material of which the cutting edge is made to be stronger than the rest of the molding element.

It will also be noted that the cutting means 7 are positioned in the molding element 1 in such a way that the distance D between each end of the cutting means and the axis of symmetry S of the cross section of the rib 5 is less than or equal to half the length Lp of the profile of the cross section, such that D=Hc*W/2. Stated differently, the axis of symmetry S intersects the profile of the rib 5 at a point C to define two sub-profiles. One first sub-profile corresponds to the segment A-C and a second sub-profile corresponds to the segment B-C. For each cutting means, the distance between the cutting edge of this cutting means and the axis of symmetry S is less than or equal to the length of the sub-profile adjacent to this cutting means, i.e. the sub-profile belonging to the nearest half-rib of the cutting means. In the example of FIG. 1, the nearest sub-profile of the cutting means 7 is the sub-profile corresponding to segment B-C.

Figure 2A:
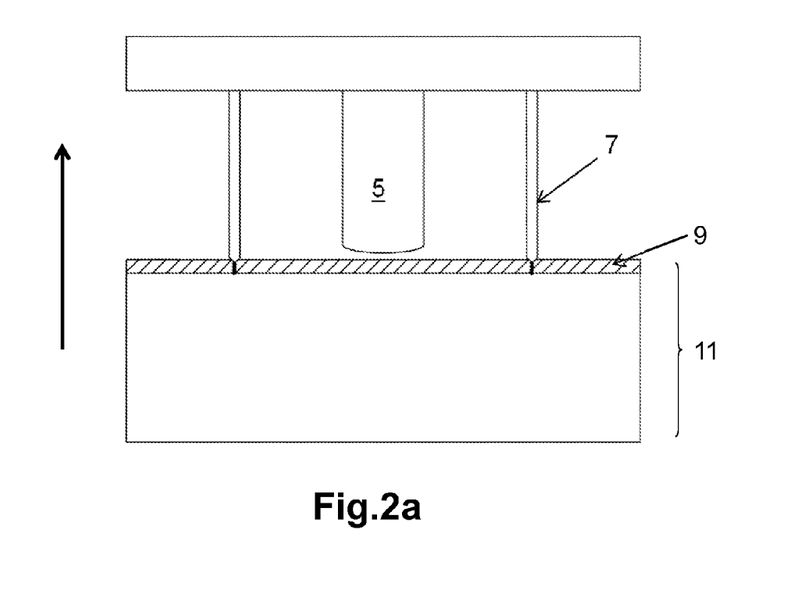
FIG. 2a illustrates a first step of molding using the molding element of FIG. 1, in which step the cutting means are in contact at their end with the cover layer covering the green tire.
Figure 2B:
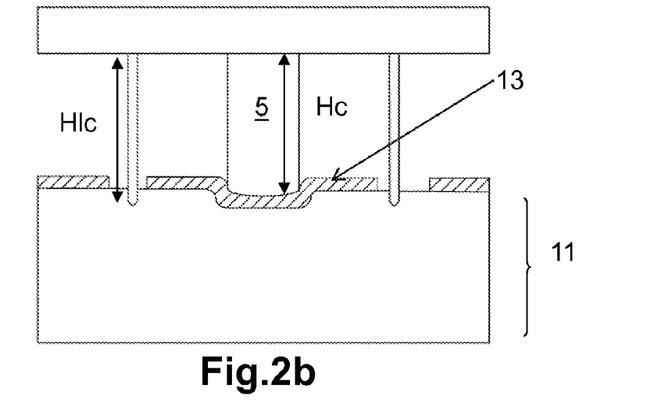
FIG. 2b illustrates a second step of molding in which the blade is in contact with the cover layer.
Figure 2C:
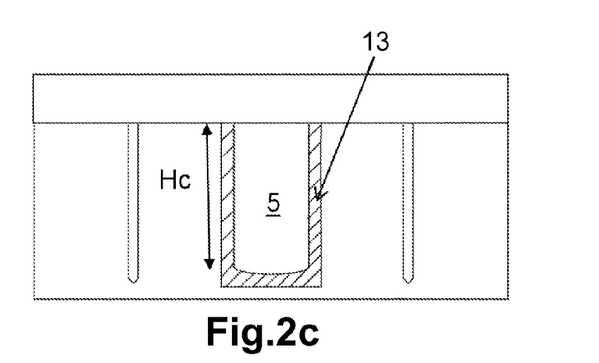
FIG. 2c illustrates a third step of molding in which the cutting means and the blade are positioned fully in the green tire.

FIGS. 2a to 2c illustrate in greater detail the various steps in introducing a cut part of the cover layer into a groove of the tread.

FIG. 2a notably discloses a first step in which the molding element 1 and the green tire 11 are moved closer together. This movement is, for example, initiated by a membrane (not depicted) in the mold. This membrane, under the action of a quantity of pressurized steam, swells and presses the green tire towards the molding element 1. More specifically, FIG. 2a shows the moment at which the cutting means 7 cut into the cover layer 9. This cutting step is made easier by the action of the cutting edges of the cutting means.

FIG. 2b illustrates a second step in which the rib 5 is impressed upon the green tire 11. More specifically, in this step, the rib 5 comes into contact with a cut part 13 of the cover layer. The rib 5 thus carries this part 13 into the depth of the green tire 11.

It will be noted here that the height Hlc of the cutting means 7 is greater than the height Hc of the rib 5. Thus, the cutting step of FIG. 2a takes place prior to the step in which the rib 5 is impressed into the green tire 11. As an alternative, it is possible to plan for the height Hlc of the cutting means 7 to be the same as the height Hc of the rib 5. In that case, the step of FIG. 2a and the step of FIG. 2b take place at the same moment.

FIG. 2c illustrates a third step in which the rib 5 is impressed into the green tire over its entire height Hc. The entirety of the part 13 of the cover layer therefore finds itself in the green tire. Once this step has been carried out, it is then possible to vulcanize the green tire, which means to say convert the rubber material of which the green tire is made from a plastic state to an elastic state. This vulcanizing step may also modify the internal structure of the cover layer.

Figure 2D:
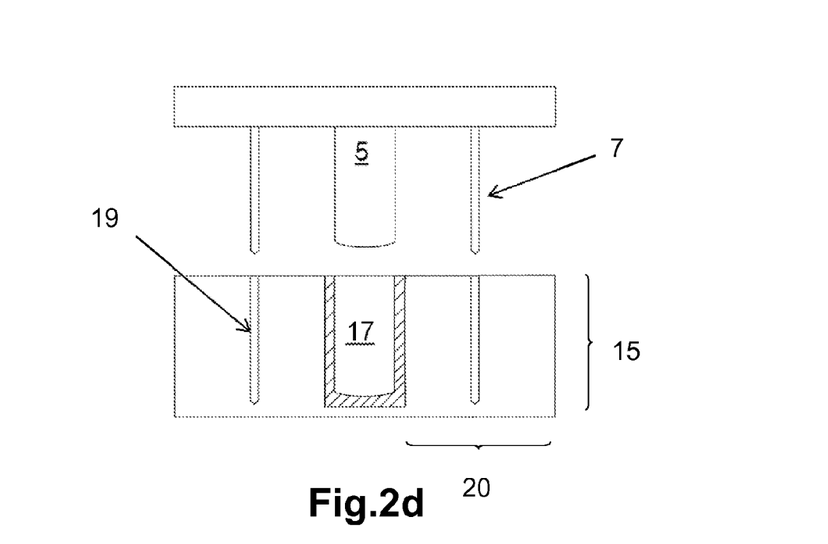
FIG. 2d schematically depicts part of the tread of a tire following the molding steps of FIGS. 2a-2c.

FIG. 2d depicts the result of the various steps of molding and vulcanizing the green tire illustrated in FIGS. 2a to 2c. The part of the tread 15 thus obtained comprises a groove 17 obtained by molding rubber around the rib 5 and two sipes 19 obtained by molding rubber around the two cutting means 7. It will be noted here that all of the walls of the groove, i.e. the lateral walls and the bottom wall flanked by the lateral walls, are covered with the cut part 13 of the cover layer.

Depending on the type of material of which the cover layer is made, the block 20 partially delimited by the groove 17 may be given specific properties. Thus, where the desire is to improve the grip of the tread on snow, the cover layer may use a material that has a dynamic shear modulus G* when subjected to a maximum alternating stress of 0.7 MPa, at a frequency of 10 Hz and a temperature of −10° C. that is higher than 60 MPa and preferably higher than 200 MPa.

In this document, the terms "elastic modulus G'" and "viscous modulus G''" denote dynamic properties well known to those skilled in the art. These properties are measured on a Metravib VA4000 viscoanalyser on test specimens molded from uncured compositions. Test specimens such as those described in the standard ASTM D 5992-96 (the version published in September 2006, initially approved in 1996), in Figure X2.1 (circular procedure) are used. The diameter of the test specimen is 10 mm (and it therefore has a circular cross section of 78.5 mm$^2$), the thickness of each of the portions of rubber composition is 2 mm, giving a "diameter/thickness" ratio of 5 (contrary to standard ISO 2856, mentioned in the ASTM standard at paragraph X2.4, and which recommends a value of 2). The response of a test specimen of vulcanized rubber composition subjected to a simple alternating sinusoidal shear stress at a frequency of 10 Hz is recorded. The test specimen is loaded under sinusoidal stressing at 10 Hz, with the stress (0.7 MPa) applied symmetrically about its equilibrium position. The measurements are taken during an increasing temperature gradient of 1.5° C. per minute, from a temperature Tmin below the glass transition temperature (Tg) of the material, up to a temperature Tmax which may correspond to the rubber plateau of the material. Before commencing the sweep, the test specimen is stabilized at the temperature Tmin for 20 minutes in order to obtain a uniform temperature throughout the test specimen. The result used is the dynamic shear elastic modulus (G') and the viscous shear modulus (G'') at the chosen temperatures (in this instance 0°, 5° and 20° C.). The "complex modulus" G* is defined as the absolute value of the complex sum of the elastic modulus G' and viscous modulus G" values:

$$G^* = \sqrt{(G'^2 + G''^2)}.$$

In one alternative form of embodiment, the elastomeric material of the cover layer contains a composition based on at least one diene elastomer with a very high sulphur content, such as ebonite.

In another alternative form of embodiment, the cover layer comprises a collection of fibres, for example a three dimensional collection of fibres forming felt. The fibres in this felt may be selected from the group consisting of textile fibres, mineral fibres and mixtures thereof. It will also be noted that the fibres in this felt may be chosen from textile fibres of natural origin, for example from the group of silk, cotton, bamboo, cellulose, wool fibres and mixtures thereof.

In another alternative form of the embodiment, the elastomeric material of the cover layer contains a composition based on at least one thermoplastic polymer, such as polyethylene terephthalate (PET). Such a polymer may have a Young's modulus higher than 1 GPa.

It will be noted that the cover layer may be a single layer. As an alternative, the cover layer may comprise several layers of different compositions. For example, the material that makes up the lower part of the cover layer in contact with the green tire may be chosen in such a way as to improve the slip of the cover layer on the green tire when the rib is driving this cover layer into the depth of the green tire. The material of which the lower layer is made may, for example, be cotton or prevulcanized rubber. Likewise, the material of which the upper part of the cover layer is made is chosen for the properties that are to be conferred upon the tread, for example better grip on snowy ground.

In another alternative form of embodiment, the material may be a two-layer material with one layer made of textile (woven or nonwoven) the function of which is to entrain a viscous material during molding. In that case, the textile material forms part of the upper layer in contact with the molding element.

Figure 3:
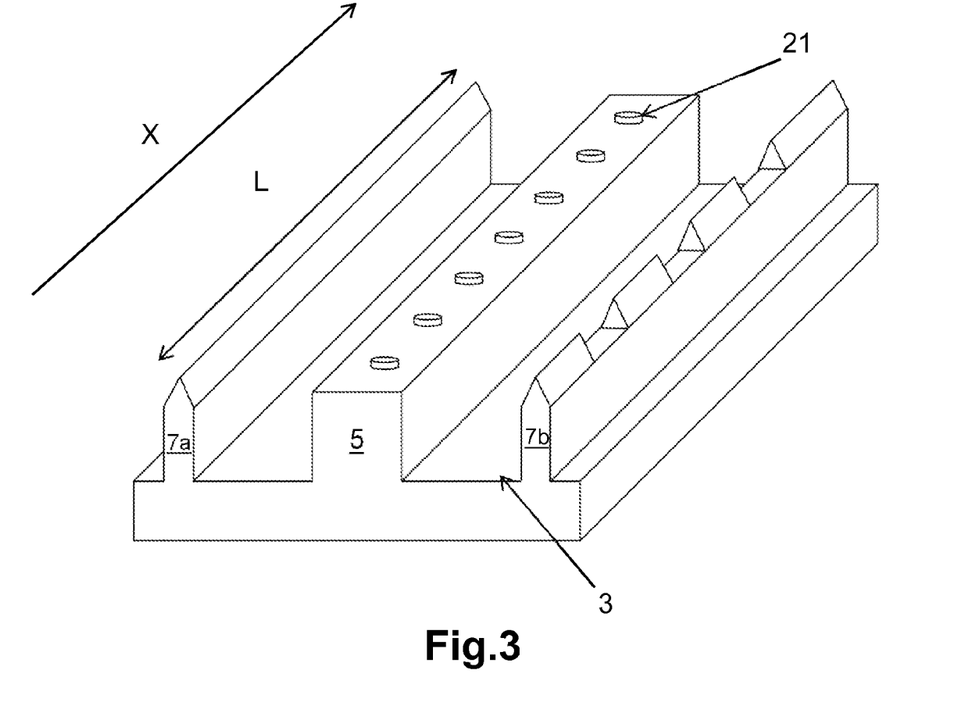
FIG. 3 is a perspective view schematically depicting a blade of a molding element of FIG. 1 comprising a plurality of protrusions at one end.

To improve the positioning of the cut part of the cover layer in the groove, FIG. 3 proposes providing protrusions 21 projecting from one end of the rib 5. These protrusions will prevent relative movements of the cut part of the cover layer in relation to the rib when the rib is in contact with this cut part. In this way, it is possible to ensure that the cover layer will be correctly driven by the rib into the depth of the green tire, making it possible to limit the risks of surplus material of which this layer is made appearing on the surface of the tread outside the groove.

The protrusions 21 here take the form of cylinders the height of which is small in comparison with the height of the rib. These cylinders have, for example, a height less than 10% of the height of the rib. These protrusions here are aligned along the length of the rib. As an alternative, there may be a certain degree of offset between these protrusions.

This FIG. 3 also schematically depicts a first cutting means 7a and a second cutting means 7b. In the first cutting means 7a, the cutting edge extends continuously in the direction of extension X. The cover layer is therefore fully cut along a cutting line. In the second cutting means 7b, the cutting edge is discontinuous. The cover layer is therefore partially cut along a cutting line. When the rib presses against the cover layer, the uncut parts of this cutting line will tear, thus allowing part of the cover layer to be introduced into the groove.

Figure 4:
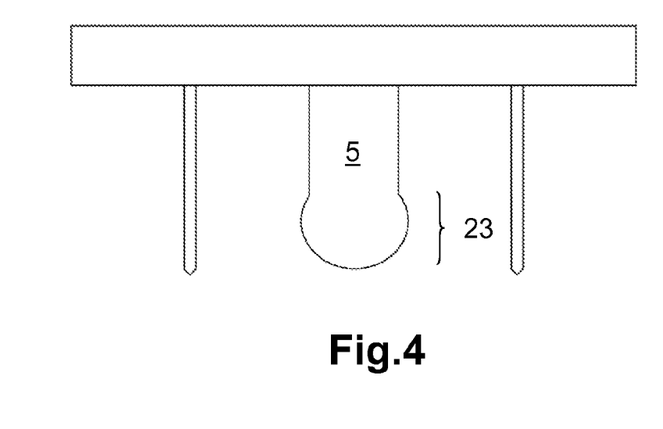
FIG. 4 schematically depicts an alternative form of a blade of a molding element of FIG. 1, in which the blade has a bulge at one end.

FIG. 4 depicts an alternative form of the rib of the molding element of FIG. 1. In this alternative form, the rib 5 at its end has a bulge 23. This bulge improves the placement of the cover layer along the walls of the groove.

Figure 5:
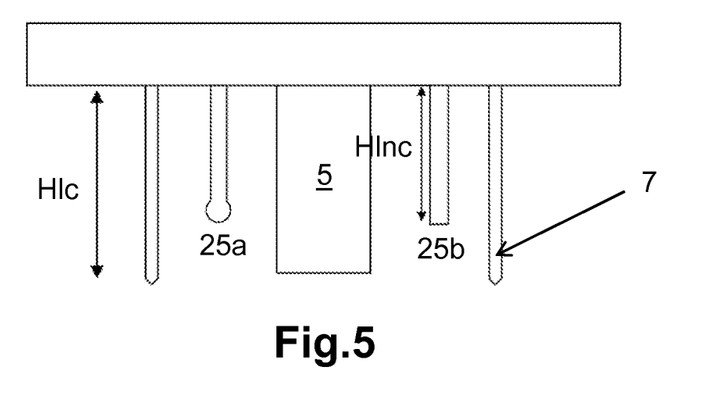
FIG. 5 depicts an alternative form of the molding element of FIG. 1 in which this molding element comprises a plurality of blades positioned between the cutting means.

In an alternative form of embodiment illustrated in FIG. 5, one or more other blades 25a, 25b are interposed between the cutting means 7 and the rib 5. These blades have a height Hlnc less than the height Hlc of the cutting means so that they do not disrupt the operation of cutting the cover layer. These additional blades may have various shapes, for example they may have a bulge at their end in order to mold internal channels within the tread. As an alternative, they may have zigzag shapes.

The invention also covers a mold comprising a plurality of molding elements as described in the various alternative forms above.

The invention is not restricted to the examples described and depicted and various modifications can be made thereto without departing from its scope.

For example, the rib of FIG. 1 may have any other shape than a rectangular shape, for example a hexagonal, triangular, diamond or some other shape.

Likewise, the cutting means may comprise at least two branches each having a cutting edge. These branches may be straight or curved, they may also meet at a common stem belonging to the cutting means.

In an alternative form of embodiment, it is possible to plan for the cutting means to have the dimensions of a rib. This cutting means then at its end comprises one or more cutting edges projecting from its end.

In another alternative form of embodiment, it is possible to plan for the blade to have the dimensions of a sipe blade terminating in a bulge at its end.

All combinations between shapes of cutting means and shape of blade are possible.

In another alternative form of the embodiment, the blade exhibits partial symmetry. For example, the blade comprises a ½ bulge at its end, creating an asymmetry. In this context, it is possible to determine an axis of symmetry for the symmetric part of the blade. It is then possible also to define two sub-profiles using the intersection of the axis of symmetry with the profile of the blade. Because of the asymmetry at the end of the blade, these two sub-profiles have different lengths.

The invention claimed is:

1. A molding element of a mold for molding and vulcanizing a tire tread, the tread comprising a tread surface adapted to come into contact with the ground when the said tire is running, the molding element comprising:
    a molding surface adapted to mold part of the tire tread surface, and
    a blade of length L and of height Hc adapted to mold a sipe or a groove in the tread, comprising a rounded end extending along the length of the blade in a direction of extension X,
    two cutting means positioned on either side of the blade at a certain distance from the blade, wherein each cutting means comprises a cutting edge extending in the direction of extension, this cutting edge making an acute angle α in a cutting plane perpendicular to the direction of extension X, wherein the height Hlc of the cutting edge is greater than or equal to the height of the blade Hc.

2. The molding element according to claim 1, wherein the angle α of the cutting edge is less than or equal to 60°.

3. The molding element according to claim 2, wherein the angle α of the cutting edge is less than or equal to 35°.

4. The molding element according to claim 3, wherein the angle α of the cutting edge is less than or equal to 20°.

5. The molding element according to claim 1, wherein the blade has a profile of length Lp exhibiting symmetry about an axis of symmetry (S) perpendicular to the molding surface, this axis of symmetry intersecting the profile of the blade at the end of this blade to define two sub-profiles, wherein for each cutting means, a distance (D) between the cutting edge of this cutting means and the axis of symmetry (S) of the profile is less than or equal to the length (½*Lp) of the sub-profile adjacent to the cutting means.

6. The molding element according to claim 5, wherein the distance (D) between the cutting edge and the axis of symmetry (S) is equal to 98% of the length of the sub-profile adjacent to the cutting means.

7. The molding element according to claim 6, wherein the distance (D) between the cutting edge and the axis of symmetry (S) is greater than or equal to half the length of the sub-profile adjacent to the cutting means.

8. The molding element according to claim 1, wherein the end of the blade has a bulge.

9. The molding element according to claim 1, wherein the cutting means comprises at least two branches, each branch comprising a cutting edge forming an acute angle.

10. The molding element according to claim 1, wherein the cutting means has the thickness of a rib, this rib having on one end at least one protrusion forming a cutting edge.

11. The molding element according to claim 1, wherein the end of the blade comprises a plurality of pads distributed along the length of the blade.

12. A mold for molding and vulcanizing a tire tread, comprising a plurality of molding elements according to claim 1.

* * * * *